UNITED STATES PATENT OFFICE.

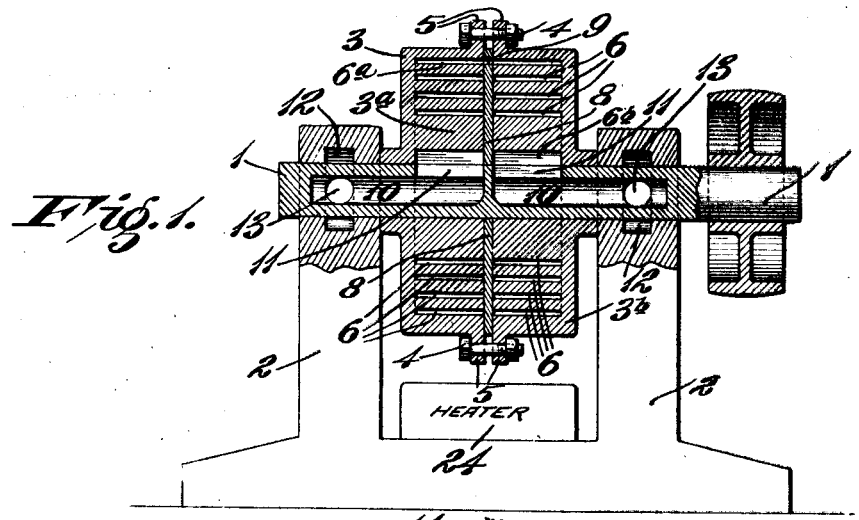
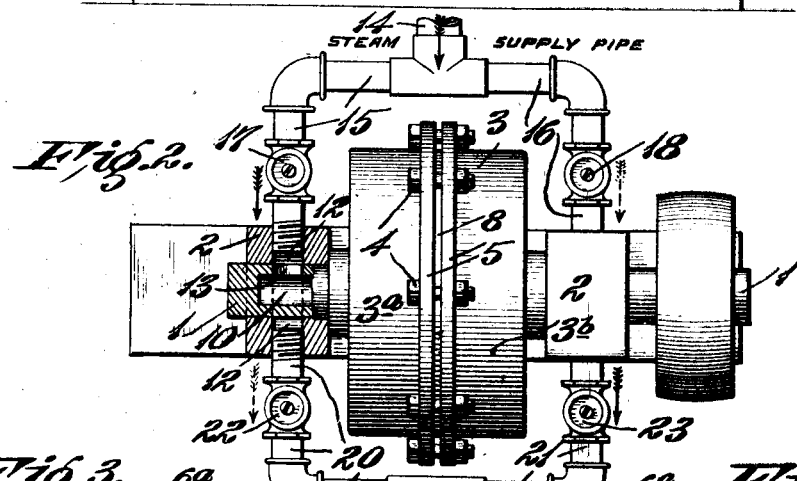
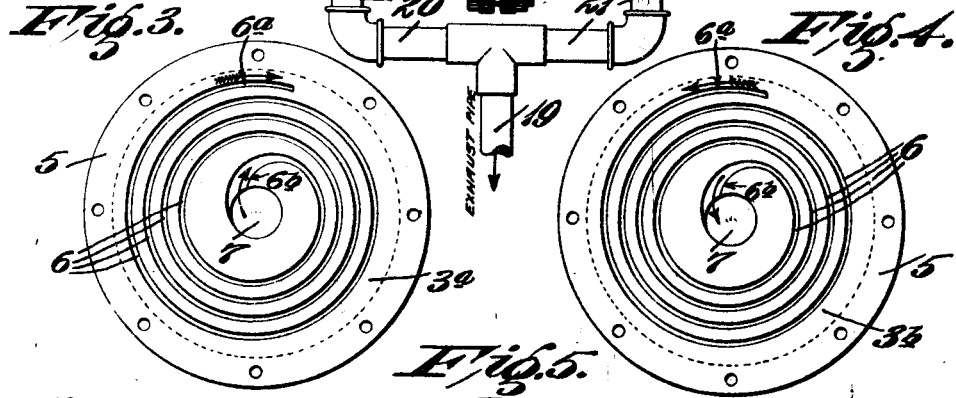

JOHN COOPER PORTER, OF ST. LOUIS, MISSOURI.

ROTARY MOTOR.

1,036,902.                Specification of Letters Patent.      Patented Aug. 27, 1912.

Application filed November 18, 1911. Serial No. 661,186.

*To all whom it may concern:*

Be it known that I, JOHN COOPER PORTER, a citizen of the United States, and a resident of the city of St. Louis and State of Missouri, have invented a new and useful Improvement in Rotary Motors, of which the following is a specification.

This invention relates to motors and more particularly to rotary motors or engines.

It has for its principal objects to secure the full force and benefit of the motive agent or fluid, whether it be steam, water or other fluids or liquids under pressure, or the products or force of a combustion or explosion of a hydrocarbon or other explosive; to utilize the friction of the agent or fluid upon the surface of a movable motor element as distinguished from impact or reaction as a means of developing power; and to attain certain advantages as will hereinafter more fully appear.

It is known that the passage of any fluid, liquid or gas under pressure through a pipe, tube or passageway is impeded by friction. This friction is generated and exists materially and effectively only in close proximity to the wall or walls of the passageway. For example, in a passageway whose walls are a considerable distance apart, there is a central body of the fluid or other agent which is out of the range of effective friction so that it passes freely without appreciable resistance. The present invention, therefore, contemplates the concentration of friction by passing the fluid or other agent through a restricted or shallow but relatively wide passageway having a relatively large wall surface and movable in the direction of the flow or travel of such agent.

The invention consists in the parts and in the arrangements and combinations of parts hereinafter described and claimed. It is to be understood, however, that I do not limit myself to the specific structure shown, nor to any particular motive agent or fluid by the term "steam," which will hereinafter be generally used throughout the specification and claims.

In the accompanying drawing which forms part of this specification and wherein like symbols refer to like parts wherever they occur,—Figure 1 is a longitudinal vertical section through a rotary engine embodying my invention; Fig. 2 is a top plan view partly in horizontal section; Fig. 3 is an inner face view of one of the rotatory elements; Fig. 4 is a similar view of the companion element; and Fig. 5 is a fragmentary view of the division plate.

The motor or concentrator shown in Figs. 1 to 5 of the drawing illustrates an adaptation of my invention. It comprises a horizontal shaft 1 which is journaled in standards 2. Fixed on the shaft to move therewith is a rotor or revolving power element 3. As shown, this element comprises two members $3^a$ and $3^b$ which are secured together by bolts 4. These members $3^a$ and $3^b$ are exact duplicates. They are substantially cylindrical and have peripheral flanges 5 at their inner margins which are perforated to receive the securing bolts 4. Each of the members is provided with a relatively deep but narrow channel or groove 6 which is arranged spirally. The outer end $6^a$ of the groove terminates near the periphery of the member, while the inner end is flared or widened, as at $6^b$, and opens into the central bore 7 in which the shaft 1 is tightly fitted. The members $3^a$ and $3^b$ are placed face to face with a division plate 8 between them, as shown in Fig. 1. The rotor is thus provided with two oppositely coiled spiral passageways which are very shallow or narrow between their convolute walls, but relatively wide transversely. The outer terminal portions of the spirals 6 are made to overlap or register, and communication is established between them through a slot 9 in said division plate 8. The shaft 1 is provided with two axial chambers 10 which communicate respectively with the inner ends of the spirals 6 through openings 11. The outer end portions of the chambers 10 communicate with annular chambers 12 in the standards 2 through openings 13. The respective chambers 12 communicate with a steam supply pipe 14 through branches 15 and 16; and ply pipe 14 through branches 15 and 16; and valves 17 and 18 are provided in the respective branches. An exhaust pipe 19 communicates with said chambers 12 through branches 20 and 21 having valves 22 and 23, respectively.

By the construction and arrangement shown a simple and inexpensive motor is produced which utilizes all the friction of the steam or equivalent motive agent in imparting motion to the rotor. Owing to the arrangement of the elongated spiral passageways starting from a central or axial supply chamber and having a multiplicity of its longest convolutions adjacent to the periphery of the rotor and then returning to axis thereof, there is a powerful concentration of friction upon the walls of the passageways at points remote from the axis and reaction is entirely eliminated.

In some cases a heater 24 may be placed under or adjacent to the rotor so as to reheat or superheat the steam passing through the restricted passageways.

By making the rotor in two sections as shown, the sections may be cast or made as exact duplicates and bolted together with the interposed division plate to constitute the two passageways. Of course, while the two sections are alike when detached, their spirals are the reverse of each other when the sections are placed together.

To operate the motor steam is admitted into one of the chambers 12 whence it passes into the axial chamber 10. It then passes through the opening 11, through the spiral passageway at that side of the rotor to the peripheral portion thereof, and thence through the opening 9 in the division plate into the opposite spiral passageway and is exhausted out through the opposite axial and annular chambers and exhaust pipe. To reverse the motor the steam is passed through it in the opposite direction. The direction of rotation is controlled by opening and closing the respective valves 17 or 18 and 22 or 23, as the case may be.

Obviously, a plurality of the rotors may be mounted on a single shaft; and the rotor or rotors may each have a plurality of the spiral passageways. So, too, instead of making the rotor as a casting or solid body, annular chambers or manifolds may be arranged on the shaft in communication with the axial chambers therein and a flattened pipe or tube or a plurality thereof may be coiled about the axis of the shaft in the form of a helix and have their ends connected to the respective annular chambers or manifolds.

The device may be easily adapted as an internal combustion or explosion engine by using the chamber 10 as a combustion or explosion chamber instead of an intake chamber for the steam or other fluid under pressure. The manner of supplying and igniting or exploding the charge is obvious. Hence, it is deemed unnecessary to illustrate the same in detail in the drawings. Except in these particulars the construction and arrangement will be substantially the same as for steam or other fluid pressure. The motor may also be operated by injecting water through one journal or axle to be changed to steam in the rotor by the heater and exhausted at the opposite journal or end of the axle, instead of taking the steam from an outside source.

What I claim is:

1. In a motor, a rotatory power element having an elongated shallow but wide spiral passageway extending around its axis, said passageway terminating at its opposite ends adjacent to the axis, the short distance across said passageway being equal to the effective range of friction, means for supplying a motive agent under pressure axially to said rotor so that it passes through said passageway in the direction said power element is moved, and means for exhausting the pressure at the opposite end of the rotor.

2. A motor comprising a rotor having an elongated passageway arranged spirally around its axis, said passageway being shallow between its convolute walls but relatively wide transversely, the long convolutions of said spiral being adjacent to the periphery of the rotor and both ends of said spiral terminating at the axis of the rotor, an axial supply chamber communicating with one end of the spiral, and a separate axial exhaust communicating with the opposite end of said spiral.

3. A motor comprising a rotatory shaft having two axial chambers therein, a rotor fixed on said shaft, said rotor having two elongated oppositely coiled spiral passageways, one of said passageways communicating at one end with one of the axial chambers in the shaft and the other passageway communicating at one end with the opposite axial chamber in said shaft, the opposite ends of said spiral passageways terminating near the periphery of the rotor and communicating with each other, means for supplying steam under pressure or an equivalent motive agent to one of said axial chambers, and means for exhausting the motive agent from the opposite axial chamber.

4. A motor comprising a rotatory shaft having two chambers therein and lateral openings for said chambers, a rotor comprising two substantially cylindrical members fixed on said shaft so as to rotate therewith, said members having spiral channels in their contiguous faces, the spiral of one member being the reverse of that of the other member, the inner end of the spirals terminating respectively with the lateral openings in the shaft so as to communicate respectively with the chambers therein, the outer ends of said spirals overlapping in register with each other, and a division plate fitted tightly between said two rotor members so as to constitute the spiral channels as separate passageways, said division plate having an opening through which communication is established between the outer ends of said spiral channels.

5. A motor comprising a rotor having two oppositely coiled shallow but relatively wide spiral passageways, said passageways beginning at the axis of the rotor and terminating near the peripheral portion thereof, the outer terminal portions of the two passageways communicating, means for supplying a motive fluid axially to the rotor at one end, and means for exhausting the pressure axially from the opposite ends of the rotor.

6. A motor comprising a rotor, said rotor comprising two cylindrical members having an axle, said members having oppositely coiled shallow but relatively wide spiral channels, said channels beginning at the axis of the rotor and terminating near the periphery thereof, the outer terminal portions of said channels communicating, means for supplying motive fluid under pressure axially to the rotor at one end and means for exhausting the pressure axially at the opposite end of the rotor.

Signed at St. Louis, Mo., this 15th day of November, 1911.

JOHN COOPER PORTER.

Witnesses:
G. A. PENNINGTON,
PAULINE AMBERG.

---

Copies of this patent may be obtained for five cents each, by addressing the "Commissioner of Patents, Washington, D. C."